United States Patent [19]
Dimroth et al.

[11] 3,926,943
[45] Dec. 16, 1975

[54] AZO PIGMENTS WITH AN ANTHRAQUINONYL COMPONENT AND A β-HYDROXYNAPHTHOIC ACID COMPONENT SUBSTITUTED BY A TRIMELLITIC ACID IMIDE VIA AN O-PHENYLENEDIAMINE

[75] Inventors: Peter Dimroth, Ludwigshafen; Manfred Gaeng, Bobenheim-Roxheim; Guenther Ruider, Ludwigshafen, all of Germany

[73] Assignee: Badische Anilin- & Soda-Fabrik Aktiengesellschaft, Ludwigshafen (Rhine), Germany

[22] Filed: Oct. 19, 1973

[21] Appl. No.: 408,057

[30] Foreign Application Priority Data
Sept. 21, 1973  Germany............................ 2251747

[52] U.S. Cl................ 260/152; 260/40 R; 260/192; 260/202; 260/326 A; 260/326 N; 260/326 S; 106/22; 106/23; 106/288 Q
[51] Int. Cl.$^2$................... C09B 29/36; C09B 43/12
[58] Field of Search..................................... 260/152

[56] References Cited
UNITED STATES PATENTS
3,468,872   9/1969   Schefczik............................ 260/152

FOREIGN PATENTS OR APPLICATIONS
1,224,739   3/1971   United Kingdom................. 260/152

*Primary Examiner*—Charles F. Warren
*Attorney, Agent, or Firm*—Johnston, Keil, Thompson & Shurtleff

[57]           ABSTRACT

Azo pigments of the β-hydroxynaphthoic acid series containing an o-phenylenediamine and a trimellitic acid imide moiety. These pigments are best illustrated by the formula

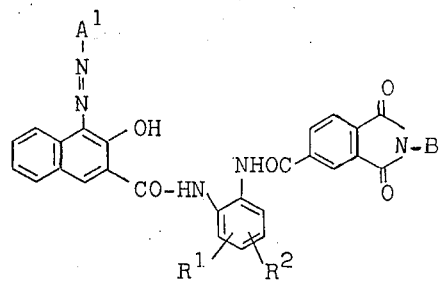

The pigments are suitable for example for coloring resins, surface coatings and printing inks and give brilliant hues of very good fastness properties.

2 Claims, No Drawings

AZO PIGMENTS WITH AN ANTHRAQUINONYL COMPONENT AND A β HYDROXYNAPHTHOIC ACID COMPONENT SUBSTITUTED BY A TRIMELLITIC ACID IMIDE VIA AN O-PHENYLENEDIAMINE

The invention relates to dyes of the formula (I):

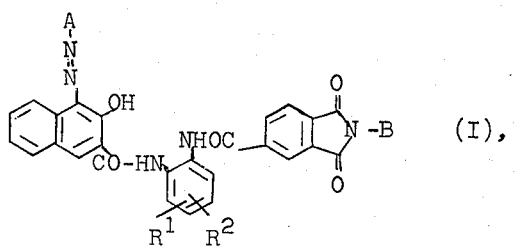

where A is the radical (which may bear chloro as substituent in the 3-position or 4-position) of 1-aminoanthraquinone or of 2,4,5-trichloroaniline; $R^1$ is hydrogen, chloro, methyl, methoxy, ethoxy, cyano, sulfonamido or carbamoyl; $R^2$ is hydrogen, chloro, methyl, methoxy or carbomethoxy; and B is hydrogen or substituted or unsubstituted alkyl, substituted or unsubstituted aralkyl or unsubstituted or substituted aryl of one to three rings which may contain heteroatoms. Examples of radicals (other than hydrogen) for B are: methyl, ethyl, n-propyl, isopropyl, n-butyl, isobutyl, tert.-butyl, benzyl, phenyl, phenyl substituted by fluoro, chloro, bromo, methyl, ethyl, isopropyl, methoxy, ethoxy, phenoxy, trifluoromethyl, phenyl, benzoyl, cyano, carbomethoxy, carbethoxy, carbamoyl, sulfonamido, acetylamino, benzoylamino, chlorobenzoylamino, methylbenzoylamino, acetoxy, benzoyloxy, methylsulfonyloxy, methylsulfonyl, methylmercapto or nitro, and naphthyl, and for example radicals of the formulae:

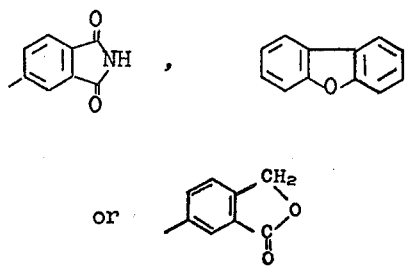

Particular industrial importance attaches to dyes of the formula (Ia):

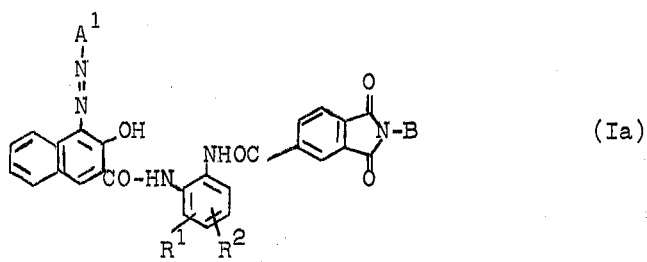

where $A^1$ is the radical of 1-aminoanthraquinone; $R^1$ is hydrogen, chloro, methyl or methoxy; $R^2$ is hydrogen or chloro; and B is hydrogen, methyl, ethyl, tert-butyl, phenyl or phenyl substituted by chloro, bromo, methyl, ethyl, isopropyl, methoxy, ethoxy, cyano, carbomethoxy, carbethoxy, carbamoyl or sulfonamido.

The new pigments of the formula (I) are distinguished by excellent brilliance also in the full shade range and in addition they usually have excellent fastness to light and weathering and highly satisfactory fastness to overcoating and plasticizers.

Some of them have a hiding power unusual for an organic pigment so that they may also be used for purposes which hitherto were reserved for inorganic pigments, for example cadmium or lead compounds, because of the high hiding power of the latter.

The new dyes may be prepared:

a. by condensing an acyl halide of the formula (II):

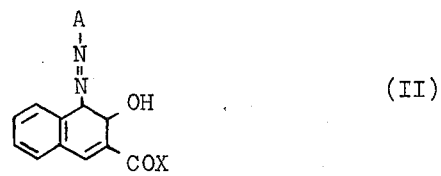

where X = Cl or Br
with an amine or the formula (III):

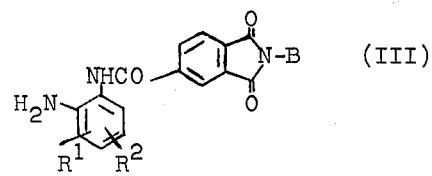

or b. coupling the diazo compound of an amine of formula (IV):

$$A—NH_2 \qquad (IV)$$

with a coupling component of formula (V):

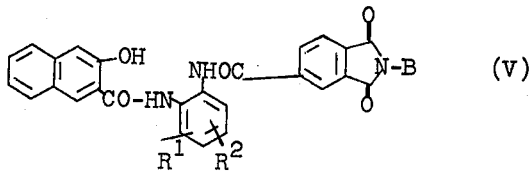

The azo dye carboxylic acids on which the azo dye acid halides (II) are based may be prepared by a conventional method by coupling a diazonium salt of the amine (IV) with β-hydroxynaphthoic acid.

The azo dye carboxylic acids obtained in this way may be converted into the corresponding acid halides (II) (chlorides or bromides) by treatment with phosphorus halides such as phosphorus pentachloride or phosphorus pentabromide, phosphorus trichloride, phosphorus oxychloride or preferably thionyl chloride.

The reaction may conveniently be carried out in an indifferent solvent such as nitrobenzene, a chlorinated benzene, toluene, a xylene, dimethylformamide or N-methylpyrrolidone; the addition of a catalytic amount of dimethylformamide or pyridine may be advantageous.

The condensation of the azo carboxylic acid halide (II) with the amine (III) is advantageously carried out in an anhydrous medium, for example by heating the components in an organic solvent such as nitrobenzene, o-dichlorobenzene, trichlorobenzene, methyl benzoate, xylene, dimethylformamide, N-methylpyrrolidone and the like, and it is expedient to add an acid-binding agent such as sodium acetate or pyridine, or a catalytic amount of a compound which accelerates acylation, e.g. collidine, dimethylformamide and the like.

An expedient embodiment of the condensation is for example to dissolve the amine (III) prior to its addition in just sufficient solvent, preferably N-methylpyrrolidone or dimethylformamide, and then to add it to the azo acyl halide (II). The reverse sequence is also possible.

In a second embodiment, the dye (I) is obtained using a conventional method to couple, with a coupling component of the formula (V), a diazotized 1-aminoanthroaquinone optionally substituted by chlorine in the 3-position or 4-position, or 2,4,5-trichloroaniline.

The coupling components of the formula (V) are obtained for example by condensation of 2-hydroxynaphthalene-3-carboxylic acid with an amine of the formula (III) in the presence of a chlorinating agent, for example phosphorus trichloride and thionyl chloride.

Coupling is conveniently effected by bringing together an aqueous alkaline solution of the coupling component (V) (or a very finely divided suspension of the coupling component (V) in water), with or without the addition of an organic solvent, and an acid solution of the diazotized amine (IV). A pH range of from 4 to 7, advantageously set up by adding a buffer, for example sodium acetate, and the addition of wetting or dispersing agents, for example aralkyl sulfonates, facilitate a uniform reaction.

Pigment dyes according to the invention are obtained in this way in a very pure chemical condition but occasionally not in the physical form optimum for all purposes for which it may be used. They may be brought into a form suitable for the purpose in hand by conventional methods such as comminution, salt milling or recrystallization.

The new pigments may be used for the mass-coloration of, for example, viscose, for the production of colored print pastes for letterpress and offset printing, for the production of colored surface coatings, for example nitrocellulose, acrylate, melamine resin or alkyd resin coating compositions, for coloring phenol or amine plastics, thermoplastics such as polystyrene, polyolefins and PVC, and rubber or silicone resins, for coloring laminate paper or boards and for textile printing.

The following Examples illustrate the invention and parts, unless otherwise stated, are parts by weight and the percentages are by weight; temperatures are given in Centigrade.

EXAMPLE 1

While stirring, 211 parts of the dye obtained by coupling diazotized 1-aminoanthraquinone with 2-hydroxynaphthoic acid-3 is heated in 950 parts of nitrobenzene with 89 parts of thionyl chloride and 3 parts of dimethylformamide for 2 hours at 80°C, and then for 3 hours at 110°C. After the reaction mixture has cooled the uniform crystalline azo dye monocarboxylic acid chloride is isolated by suction filtration, washed with 300 parts of nitrobenzene, then with 200 parts of benzene and finally with 400 parts of cyclohexane, and dried at 80°C at subatmospheric pressure. 195 parts of a red crystalline powder is obtained. Analysis: calculated 8.05% Cl; found 8.1% Cl.

22.0 parts of the azo dye monocarboxylic acid chloride prepared as described above is heated in 600 parts of nitrobenzene at 70°C. 24.8 parts of finely powdered amine of the formula:

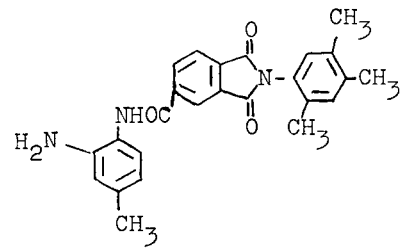

which has previously been dissolved in 100 parts of N-methylpyrrolidone is then added with gentle heating. The mixture is heated for 5 hours at 140°C while stirring. After cooling to 80°C the deposited sparingly soluble pigment is suction filtered, washed with nitrobenzene and then with methanol until the filtrate runs away clear. To obtain a water-moist paste the pigment is additionally washed with water. To improve the pigment it may (in the form of the methanol-moist product) be boiled for two hours in methanol or another solvent or stirred at ambient temperature.

After drying at 80°C at subatmospheric pressure 37 parts of a red powder is obtained which is practically insoluble in the usual solvents. The pigment has the formula:

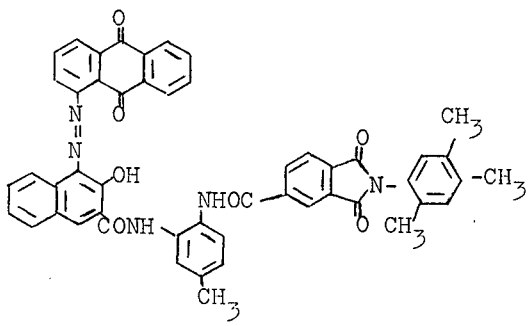

It colors PVC film and sheeting and surface coatings brilliant red hues having excellent fastness to light, migration and overcoating. The excellent brilliance which can be achieved in the case of strong dyeings (full shade) is particularly noteworthy.

Other monoazo pigments are obtained with the components given in the following Table by coupling 1 mole of the diazo compound of the amine specified in column I with 1 mole of 2-hydroxynaphthoic acid-3, converting the monoazo dye carboxylic acid obtained into the acid halide and condensing this with 1 mole of the amine specified in column II.

Column III gives the hue of a surface coating prepared with the pigment obtained.

| Ex. | I | II | III |
|---|---|---|---|
| 2 | 1-aminoanthraquinone | (structure) | red |
| 3 | " | (structure) | reddish brown |
| 4 | " | (structure) | maroon |
| 5 | 1-aminoanthraquinone | (structure) | red |
| 6 | " | (structure) | bluish red |
| 7 | " | (structure) | reddish brown |

-continued
| Ex. | I | II | III |
|---|---|---|---|
| 8 | 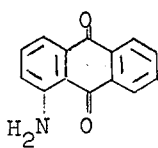 | 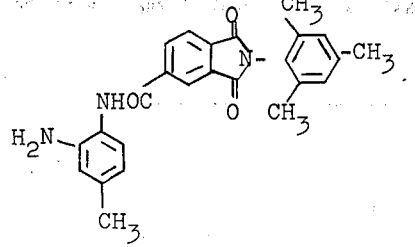 | red |
| 9 | " | 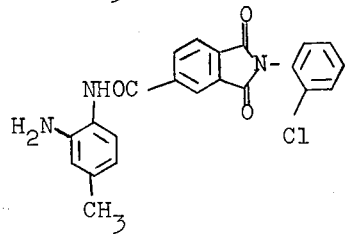 | red |
| 10 | " | 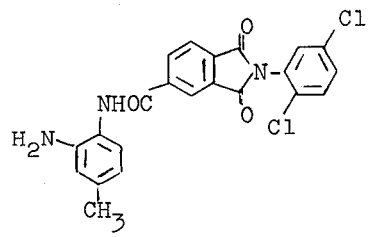 | red |
| 11 | " | 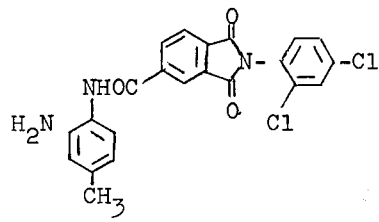 | red |
| 12 | " | 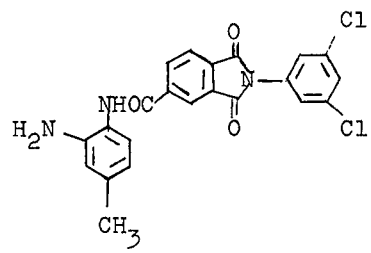 | bluish red |
| 13 | " | 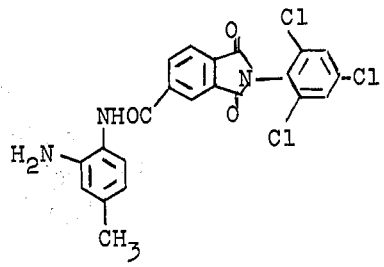 | red |

-continued
| Ex. | I | II | III |
|---|---|---|---|
| 14 | 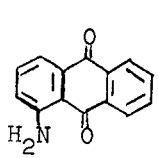 | 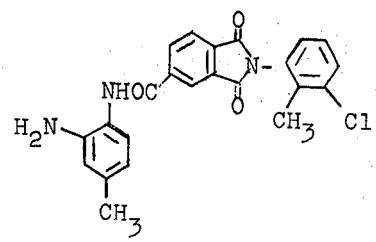 | red |
| 15 | " | 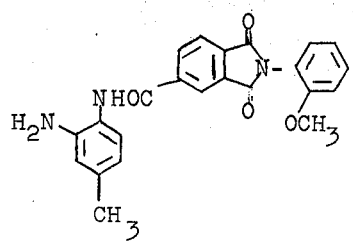 | bluish red |
| 16 | " | 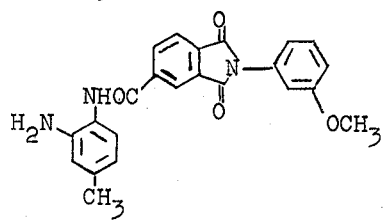 | bluish red |
| 17 | " | 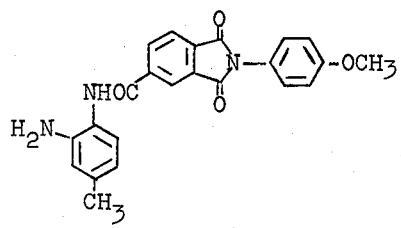 | red |
| 18 | " | 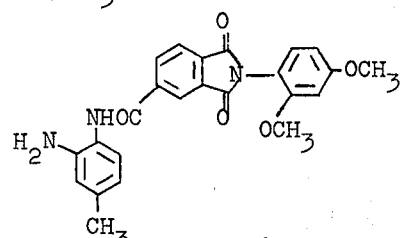 | bluish red |
| 19 | " | 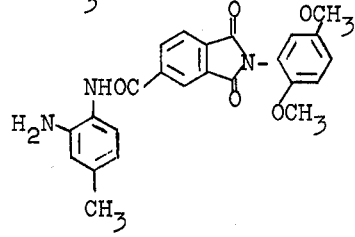 | red |
| 20 | " | 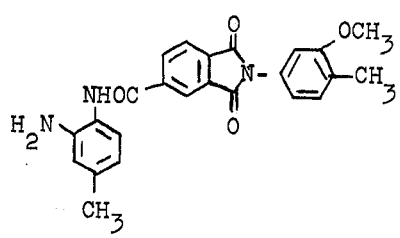 | bluish red |

| Ex. | I | II | III |
|---|---|---|---|
| 21 | 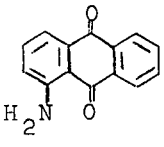 | 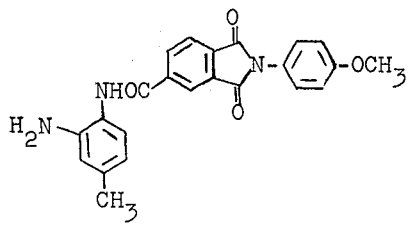 | bluish red |
| 22 | " | 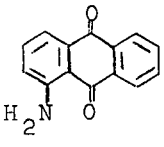 | bluish red |
| 23 | " | 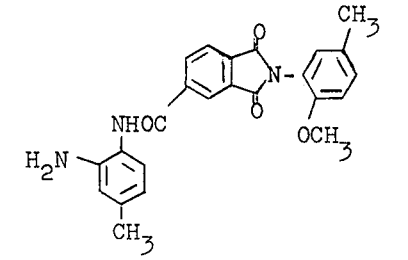 | red |
| 24 | " | 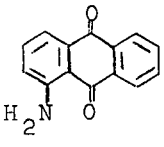 | red |
| 25 | " | 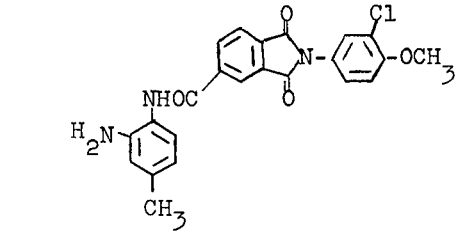 | bluish red |
| 26 | " | 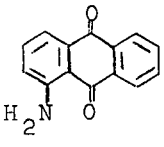 | red |

| Ex. | I | II | III |
|---|---|---|---|
| 27 | 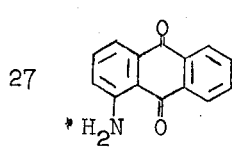 | 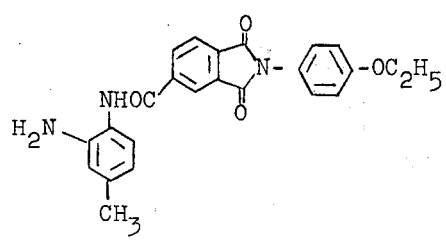 | red |
| 28 | " | 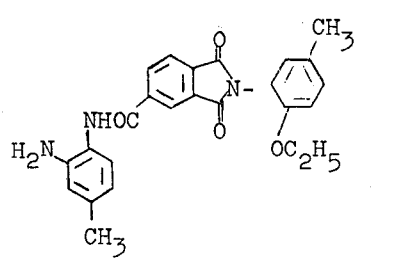 | bluish red |
| 29 | " | 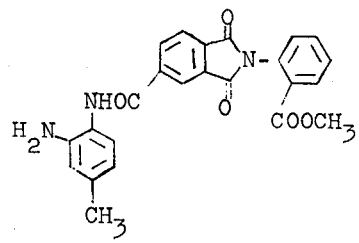 | red |
| 30 | " | 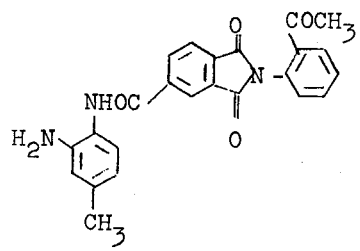 | red |
| 31 | " | 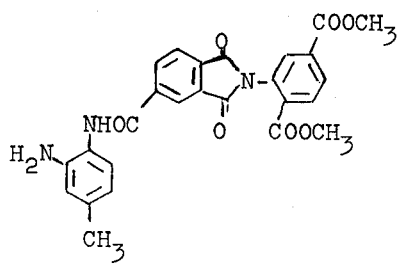 | red |
| 32 | " | 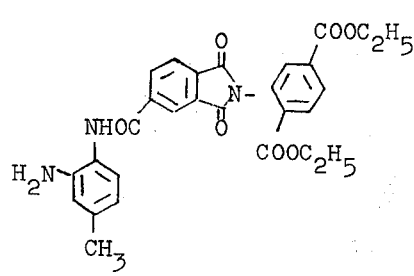 | red |

-continued

| Ex. | I | II | III |
|---|---|---|---|
| 33 | 1-aminoanthraquinone | 2-amino-4-methyl-phenyl amide of N-(4-sulfamoylphenyl)phthalimide-5-carboxylic acid | bluish red |
| 34 | " | 2-amino-4-methyl-phenyl amide of N-(2-chloro-5-methylsulfonylphenyl)phthalimide-5-carboxylic acid | bluish red |
| 35 | " | 2-amino-4-methyl-phenyl amide of phthalimide-5-carboxylic acid | red |
| 36 | " | 2-amino-4-methyl-phenyl amide of N-methylphthalimide-5-carboxylic acid | red |
| 37 | " | 2-amino-4-methyl-phenyl amide of N-ethylphthalimide-5-carboxylic acid | red |
| 38 | " | 2-amino-4-chloro-phenyl amide of N-phenylphthalimide-5-carboxylic acid | red |

-continued
| Ex. | I | II | III |
|---|---|---|---|
| 39 | 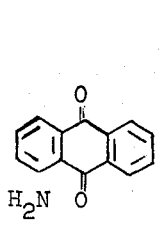 | 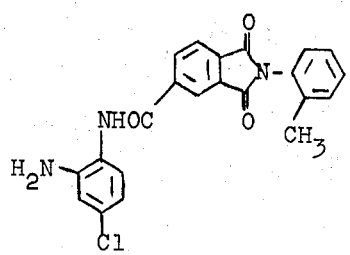 | red |
| 40 | " | 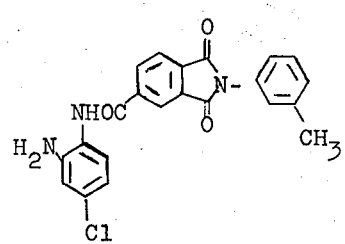 | bluish red |
| 41 | " | 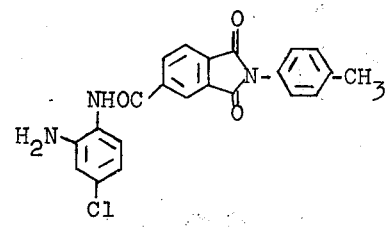 | red |
| 42 | " | 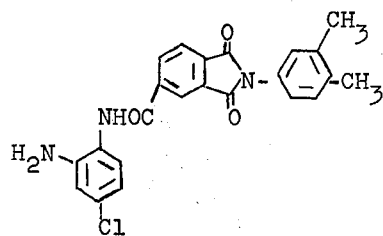 | red |
| 43 | " | 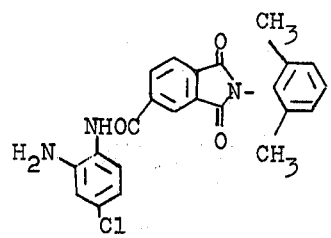 | maroon |
| 44 | " | 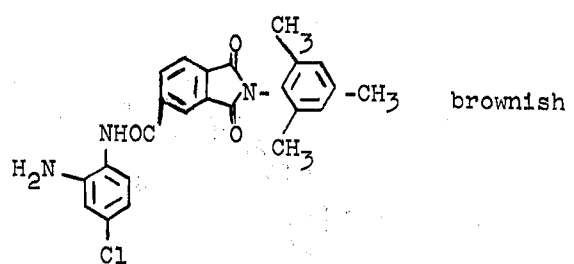 | brownish red |

-continued

| Ex. | I | II | III |
|---|---|---|---|
| 45 | 1-aminoanthraquinone | 2-amino-4-chloroanilide of N-(2-chlorophenyl)phthalimide-5-carboxylic acid | red |
| 46 | " | 2-amino-4-chloroanilide of N-(2,6-dichlorophenyl)phthalimide-5-carboxylic acid | bluish red |
| 47 | " | 2-amino-4-chloroanilide of N-(2,4-dichlorophenyl)phthalimide-5-carboxylic acid | red |
| 48 | " | 2-amino-4-chloroanilide of N-(3,5-dichlorophenyl)phthalimide-5-carboxylic acid | red |
| 49 | " | 2-amino-4-chloroanilide of N-(2,4,5-trichlorophenyl)phthalimide-5-carboxylic acid | red |
| 50 | " | 2-amino-4-chloroanilide of N-(3-chloro-2-methylphenyl)phthalimide-5-carboxylic acid | red |
| 51 | " | 2-amino-4-chloroanilide of N-(2-methoxyphenyl)phthalimide-5-carboxylic acid | bluish red |

-continued

| Ex. | I | II | III |
|---|---|---|---|
| 52 | 1-aminoanthraquinone | 2-amino-4-chloro-phenyl amide of N-(3-methoxyphenyl)phthalimide-5-carboxylic acid | bluish red |
| 53 | " | 2-amino-4-chloro-phenyl amide of N-(4-methoxyphenyl)phthalimide-5-carboxylic acid | red |
| 54 | " | 2-amino-4-chloro-phenyl amide of N-(2,3-dimethoxyphenyl)phthalimide-5-carboxylic acid | bluish red |
| 55 | " | 2-amino-4-chloro-phenyl amide of N-(2,4-dimethoxyphenyl)phthalimide-5-carboxylic acid | bluish red |
| 56 | " | 2-amino-4-chloro-phenyl amide of N-(3-methoxy-2-methylphenyl)phthalimide-5-carboxylic acid | bluish red |
| 57 | " | 2-amino-4-chloro-phenyl amide of N-(2-methoxy-3-methylphenyl)phthalimide-5-carboxylic acid | red |
| 58 | " | 2-amino-4-chloro-phenyl amide of N-(2-methoxy-5-methylphenyl)phthalimide-5-carboxylic acid | bluish red |

-continued

| Ex. | I | II | III |
|---|---|---|---|
| 59 | 1-aminoanthraquinone | [structure: phthalimide with NHCO-linked 2-amino-4-chlorophenyl, N-(3-chloro-4-methoxyphenyl)] | red |
| 60 | " | [structure: phthalimide with NHCO-linked 2-amino-4-chlorophenyl, N-(3-chloro-4-methoxyphenyl)] | bluish red |
| 61 | " | [structure: phthalimide with NHCO-linked 2-amino-4-chlorophenyl, N-(2,5-dimethyl-... 3-chloro-... OCH$_3$)] | bluish red |
| 62 | " | [structure: phthalimide with NHCO-linked 2-amino-4-chlorophenyl, N-(2,5-bis(COOCH$_3$)phenyl)] | red |
| 63 | " | [structure: phthalimide with NHCO-linked 2-amino-4-chlorophenyl, N-(2,5-bis(COOC$_2$H$_5$)phenyl)] | red |
| 64 | " | [structure: phthalimide with NHCO-linked 2-amino-4-chlorophenyl, N-(4-SO$_2$NH$_2$-phenyl)] | bluish red |

| Ex. | I | II | III |
|---|---|---|---|
| 65 | 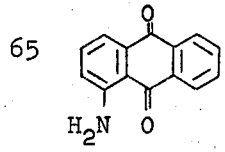 | 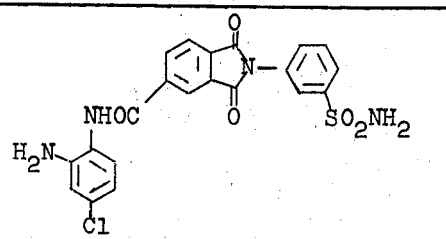 | bluish red |
| 66 | " | 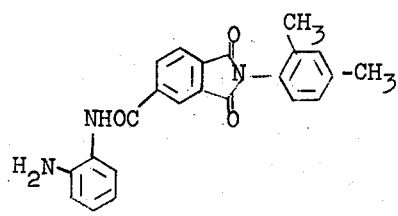 | brownish red |
| 67 | " | 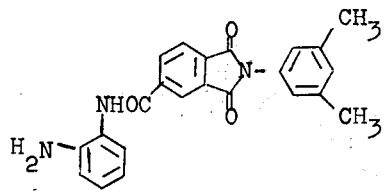 | red |
| 68 | " | 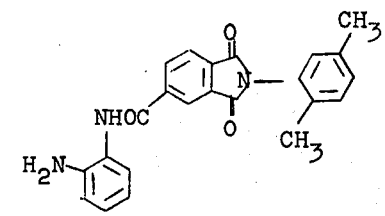 | red |
| 69 | " | 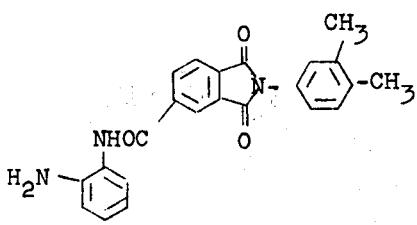 | maroon |
| 70 | " | 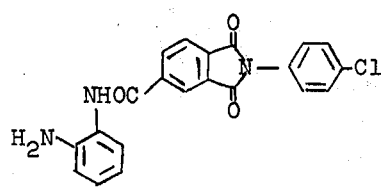 | red |
| 71 | " | 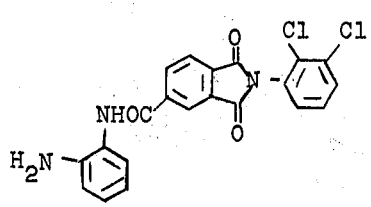 | red |

—Continued
| Ex. | I | II | III |
|---|---|---|---|
| 72 | 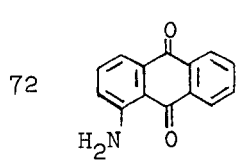 | 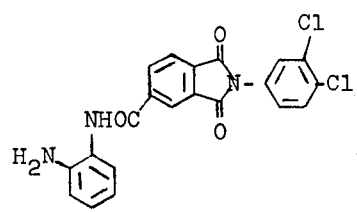 | red |
| 73 | " | 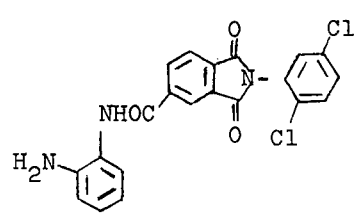 | bluish red |
| 74 | " | 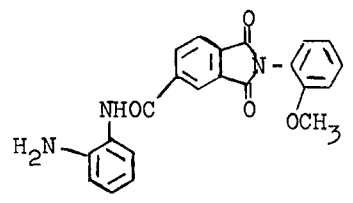 | bluish red |
| 75 | " | 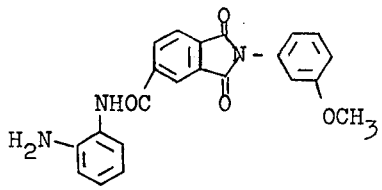 | red |
| 76 | " | 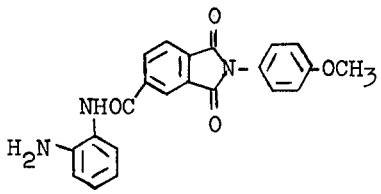 | red |
| 77 | " | 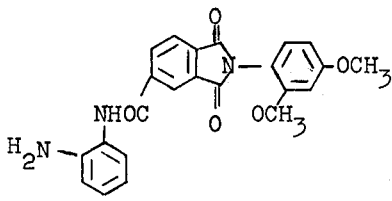 | bluish red |
| 78 | " | 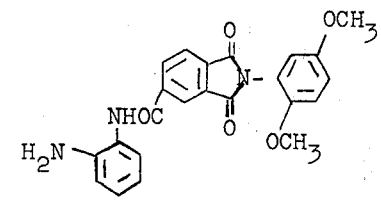 | bluish red |

| Ex. | I | II | III |
|---|---|---|---|
| 79 | 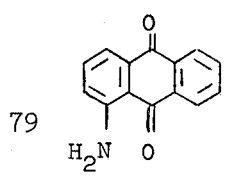 | 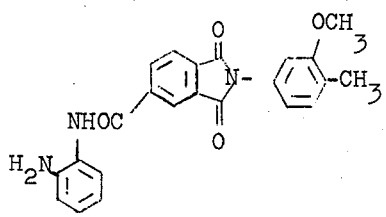 | red |
| 80 | " | 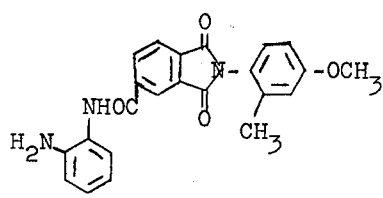 | red |
| 81 | " | 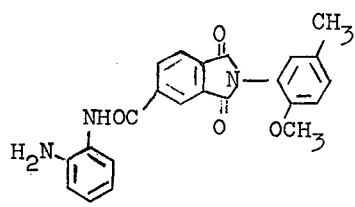 | bluish red |
| 82 | " | 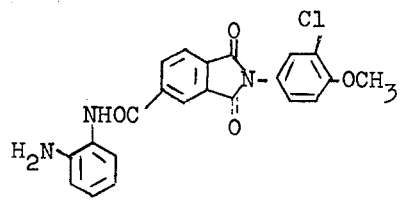 | red |
| 83 | " | 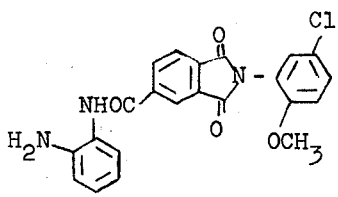 | bluish red |
| 84 | " | 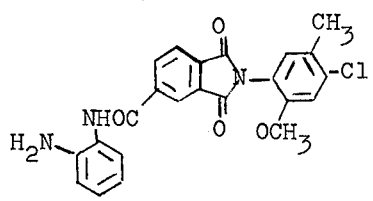 | bluish red |
| 85 | " | 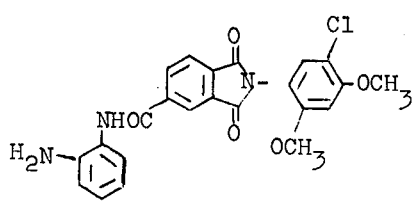 | bluish red |

-Continued
| Ex. | I | II | III |
|---|---|---|---|
| 86 | 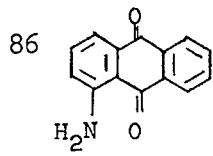 | 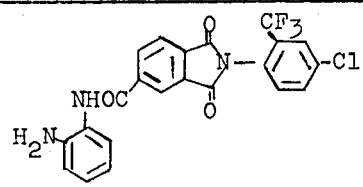 | red |
| 87 | " | 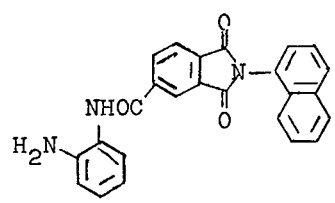 | red |
| 88 | " | 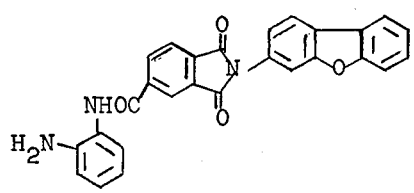 | red |
| 89 | " | 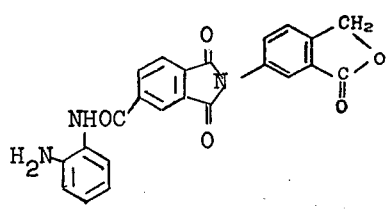 | brownish red |
| 90 | " | 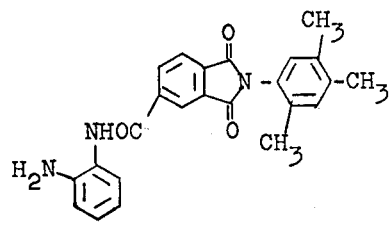 | red |
| 91 | " | 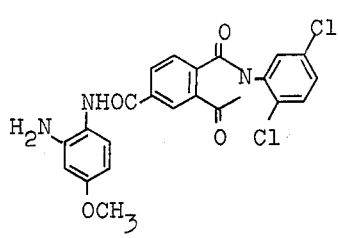 | red |
| 92 | " | 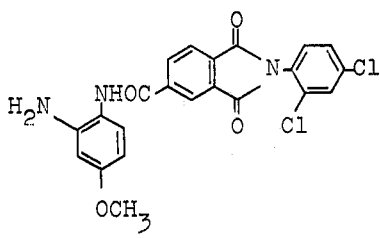 | red |

—Continued
| Ex. | I | II | III |
|---|---|---|---|
| 93 | 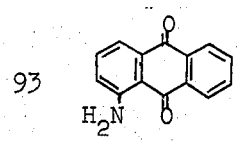 | 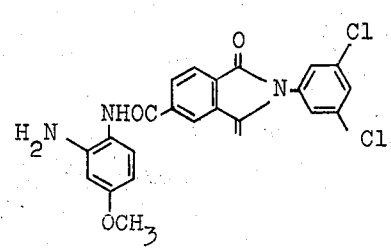 | bluish red |
| 94 | " | 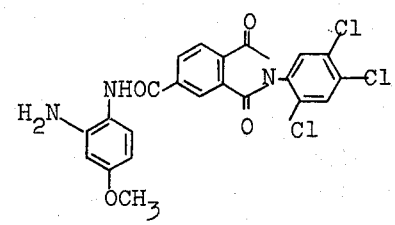 | brown |
| 95 | " | 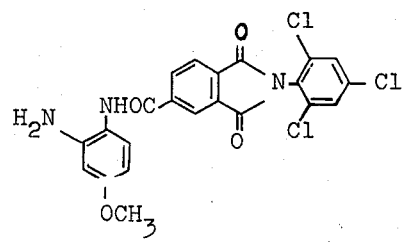 | brownish red |
| 96 | " | 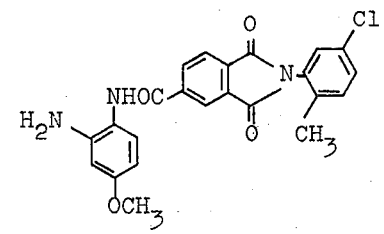 | bluish red |
| 97 | " | 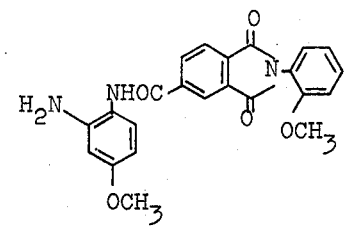 | bluish red |
| 98 | " | 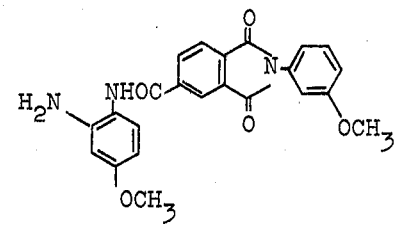 | red |
| 99 | " | 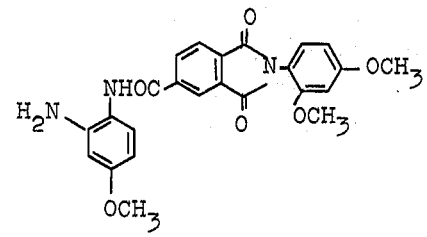 | bluish red |

| Ex. | I | II | III |
|---|---|---|---|
| 100 | 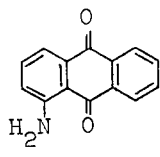 | 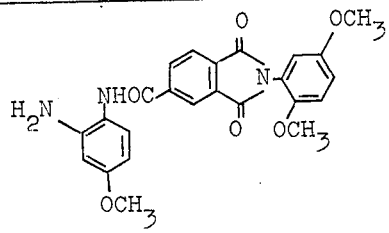 | bluish red |
| 101 | " | 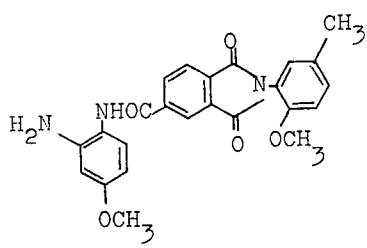 | bluish red |
| 102 | " | 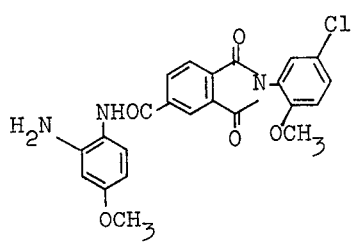 | bluish red |
| 103 | " | 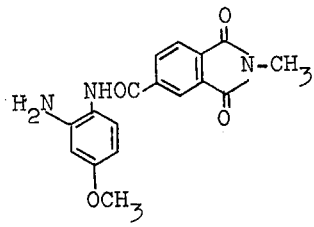 | red |
| 104 | " | 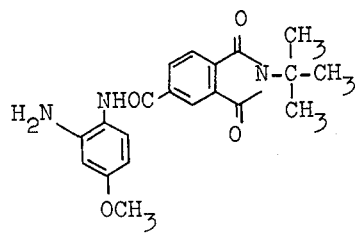 | red |
| 105 | " | 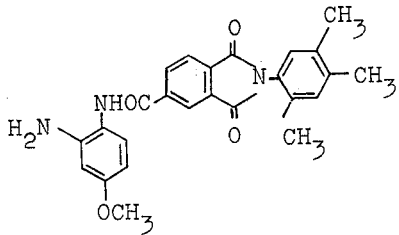 | red |

| Ex. | I | II | III |
|---|---|---|---|
| 106 | 1-aminoanthraquinone | 2-amino-4-ethoxyphenyl-NHOC-(2-phenyl-1,3-dioxo-isoindolin-5-yl) | red |
| 107 | " | 2-amino-4-ethoxyphenyl-NHOC-(2-(2,5-dimethylphenyl)-1,3-dioxo-isoindolin-5-yl) | bluish red |
| 108 | " | 2-amino-4-ethoxyphenyl-NHOC-(2-(2,4,5-trimethylphenyl)-1,3-dioxo-isoindolin-5-yl) | red |
| 109 | " | 2-amino-4-ethoxyphenyl-NHOC-(2-(3-chlorophenyl)-1,3-dioxo-isoindolin-5-yl) | red |
| 110 | " | 2-amino-4-ethoxyphenyl-NHOC-(2-(2,5-dichlorophenyl)-1,3-dioxo-isoindolin-5-yl) | bluish red |
| 111 | " | 2-amino-4-ethoxyphenyl-NHOC-(2-(2,4,5-trichlorophenyl)-1,3-dioxo-isoindolin-5-yl) | red |
| 112 | " | 2-amino-4-ethoxyphenyl-NHOC-(2-(5-chloro-2-methylphenyl)-1,3-dioxo-isoindolin-5-yl) | bluish red |

| Ex. | I | II | III |
|---|---|---|---|
| 113 | 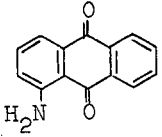 | 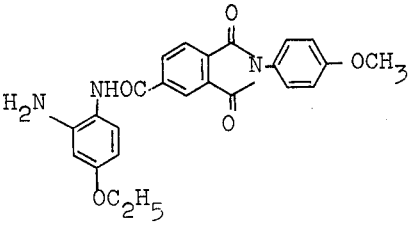 | red |
| 114 | " | 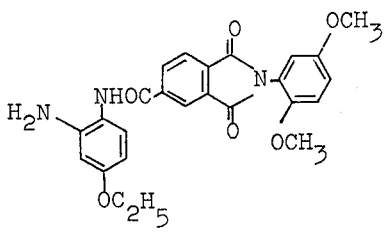 | bluish red |
| 115 | " | 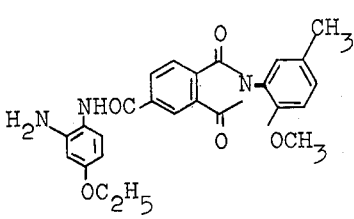 | bluish red |
| 116 | " | 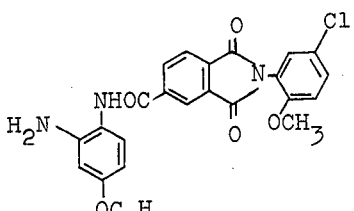 | bluish red |
| 117 | " | 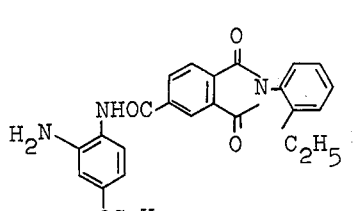 | red |
| 118 | " | 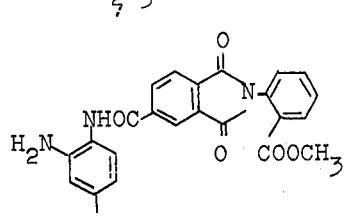 | red |
| 119 | " | 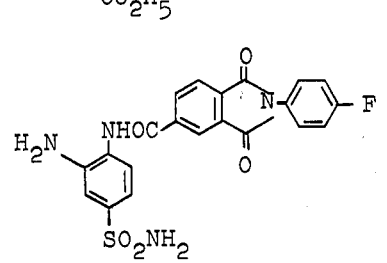 | red |

—Continued
| Ex. | I | II | III |
|---|---|---|---|
| 120 | 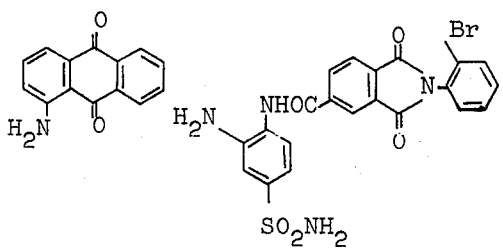 | 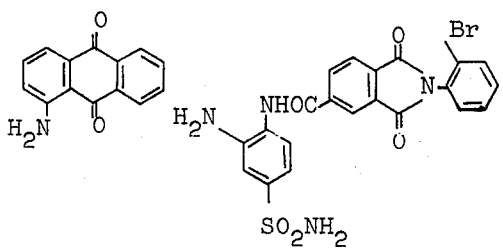 | red |
| 121 | " | 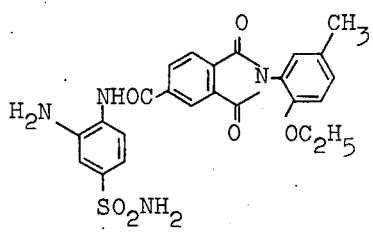 | bluish red |
| 122 | " | 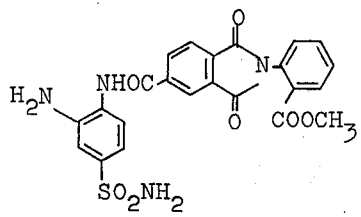 | red |
| 123 | " | 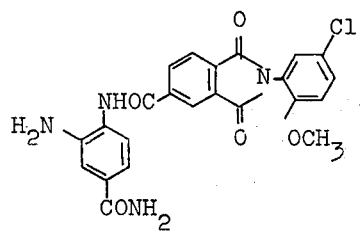 | bluish red |
| 124 | " | 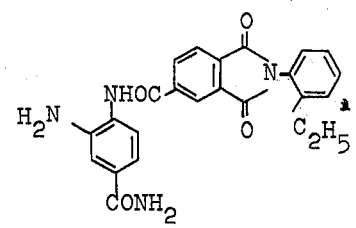 | red |
| 125 | " | 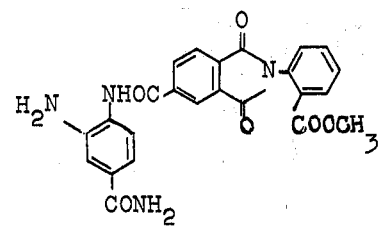 | red |

| Ex. | I | II | III |
|---|---|---|---|
| 126 | 1-aminoanthraquinone | 2-amino-4-carbamoyl-anilide of 2-(4-carbamoylphenyl)-1,3-dioxo-2,3-dihydro-1H-isoindole-5-carboxylic acid | maroon |
| 127 | " | 2-amino-4,5-dichloro-anilide of 2-phenyl-1,3-dioxo-2,3-dihydro-1H-isoindole-5-carboxylic acid | red |
| 128 | " | 2-amino-4,5-dichloro-anilide of 2-(2,4,5-trimethylphenyl)-1,3-dioxo-2,3-dihydro-1H-isoindole-5-carboxylic acid | red |
| 129 | " | 2-amino-4,5-dichloro-anilide of 2-(2-chlorophenyl)-1,3-dioxo-2,3-dihydro-1H-isoindole-5-carboxylic acid | red |
| 130 | " | 2-amino-4,5-dichloro-anilide of 2-(2-methoxyphenyl)-1,3-dioxo-2,3-dihydro-1H-isoindole-5-carboxylic acid | red |
| 131 | " | 2-amino-4-chloro-5-cyano-anilide of 2-methyl-1,3-dioxo-2,3-dihydro-1H-isoindole-5-carboxylic acid | red |
| 132 | 1-amino-3-chloroanthraquinone | 2-amino-4-methyl-anilide of 2-(2,4,5-trimethylphenyl)-1,3-dioxo-2,3-dihydro-1H-isoindole-5-carboxylic acid | red |

(Note: Column II entries are shown as structural formulas in the source.)

| Ex. | I | II | III |
|---|---|---|---|
| 133 | 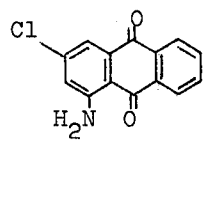 | 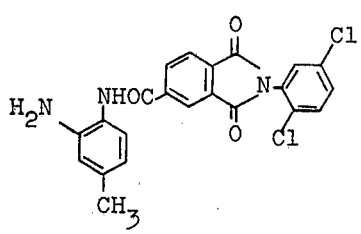 | bluish red |
| 134 | " | 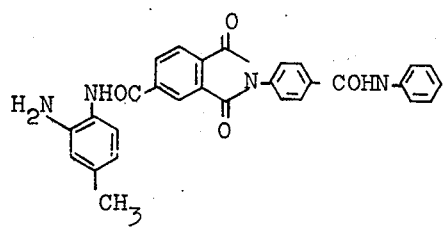 | red |
| 135 | " | 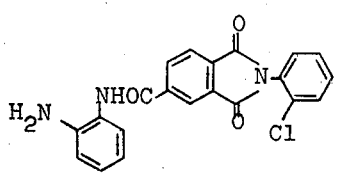 | brownish red |
| 136 | " | 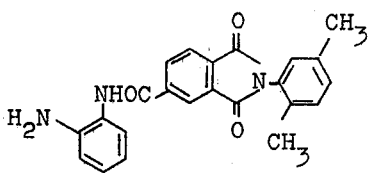 | red |
| 137 | " | 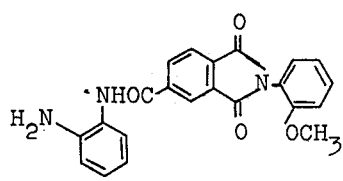 | bluish red |
| 138 | " | 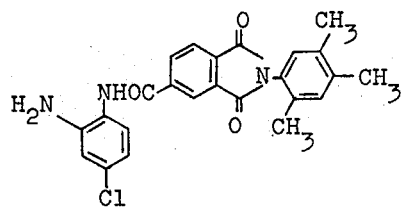 | red |
| 139 | " | 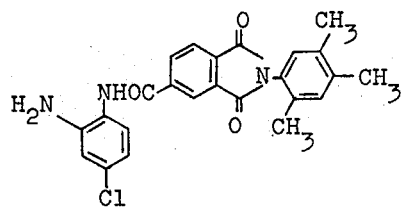 | red |

| Ex. | I | II | III |
|---|---|---|---|
| 140 | 1-amino-3-chloroanthraquinone | 4-acetyl-N-(2-amino-4-chlorophenyl)carbamoyl-N'-(3,4-dichlorophenyl)phthalimide derivative | red |
| 141 | " | N-(2-amino-4-chlorophenyl)carbamoyl-N'-(3-methoxyphenyl)phthalimide | red |
| 142 | " | N-(2-amino-4-chlorophenyl)carbamoyl-N'-(3-methoxy-4-methylphenyl)phthalimide | red |
| 143 | " | 4-acetyl-N-(2-amino-4-methylphenyl)carbamoyl-N'-(2,4,6-trimethylphenyl)phthalimide | red |
| 144 | " | N-(2-amino-4-methylphenyl)carbamoyl-N'-(3-chlorophenyl)phthalimide | red |
| 145 | " | N-(2-amino-4-methylphenyl)carbamoyl-N'-(2,5-dichlorophenyl)phthalimide | red |
| 146 | " | N-(2-amino-4-methylphenyl)carbamoyl-N'-(2-methoxyphenyl)phthalimide | red |

-continued

| Ex. | I | II | III |
|---|---|---|---|
| 147 | 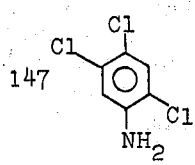 | 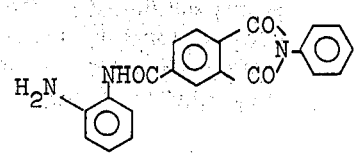 | red |
| 148 | " | 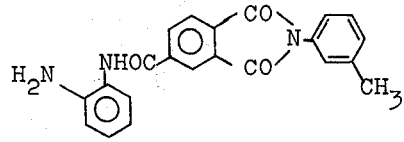 | brownish red |
| 149 | " | 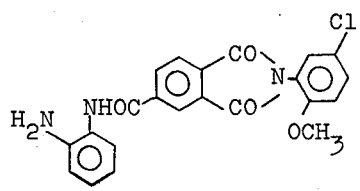 | red |
| 150 | " | 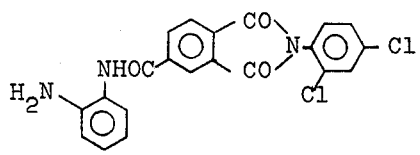 | red |
| 151 | " | 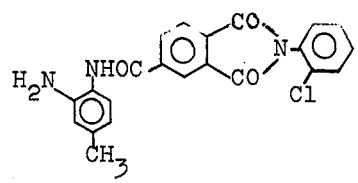 | red |

EXAMPLES ILLUSTRATING USE OF THE PIGMENTS

USE EXAMPLE 1

In Surface Coatings:

5 parts of the dye obtained in accordance with Example 1 and 95 parts of a baking finish mixture (for example 70% of coconut alkyd resin (60% in xylene) and 30% of melamine resin (about 55% in a mixture of butanol and xylene)) are ground in an attrition mill. After having been applied and subjected to baking for 30 minutes at 120° C bright full shade coatings are obtained having very good fastness to light and overcoating. Reduction for example with $TiO_2$ gives bright shades.

USE EXAMPLE 2

In Plastics:

Strong, lightfast and oustandingly bright colorations are obtained in flexible PVC by incorporating for example 0.05 part of the pigment obtained in accordance with Example 1 into 50 parts of a flexible-PVC mixture consisting of 65 parts of PVC powder (for example VINOFLEX 531), 35 parts of plasticizer (for example PALATINOL AH), and 2 parts of stabilizer. Incorporation is carried out on heated mixing rolls at 140°C over a period of from 8 to 10 minutes.

White reduction may be achieved for example by admixing 0.25 part of the dye obtained in accordance with Example 1 and 50 parts of flexible-PVC mixture with 2.5 parts of $TiO_2$ (for example RN 56).

USE EXAMPLE 3

In Printing Inks:

5 parts of the dye obtained in accordance with Example 1, 30 to 40 parts or resin (for example rosin modified with phenolformaldehyde) and 65 to 55 parts of toluene are intimately mixed in a dispersing unit. A toluene intaglio printing ink having excellent light fastness and outstanding brilliance is thus obtained.

We claim:

1. An azo pigment of the formula

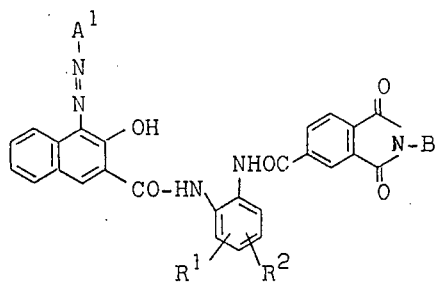

wherein:
- $A^1$ is anthraquinonyl-1;
- $R^1$ is hydrogen, chlorine, methyl or methoxy; and
- B is hydrogen, methyl, ethyl, t-butyl, phenyl or phenyl substituted by chlorine, bromine, methyl, ethyl, isopropyl, methoxy, ethoxy, cyano, carbomethoxy, carboethoxy, carbamoyl or sulfamoyl.

2. The azo pigment having the formula

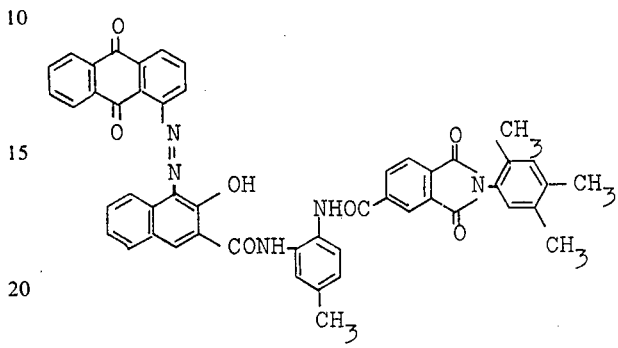

\* \* \* \* \*